(No Model.) 4 Sheets—Sheet 1.

G. D'INFREVILLE.
ZINC ELECTRODE FOR GALVANIC BATTERIES.

No. 422,925. Patented Mar. 11, 1890.

Witnesses:

Inventor:
Georges d'Infreville
By H. C. Townsend
Attorney (No Model.) 4 Sheets—Sheet 2.
G. D'INFREVILLE.
ZINC ELECTRODE FOR GALVANIC BATTERIES.
No. 422,925. Patented Mar. 11, 1890.
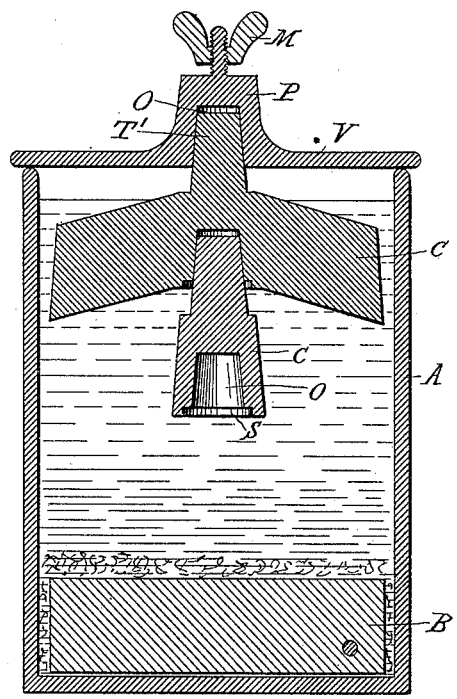
Fig. 6.
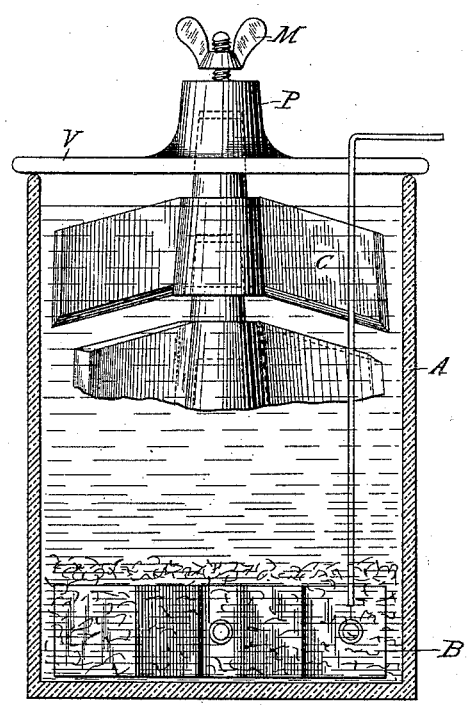
Fig. 7.
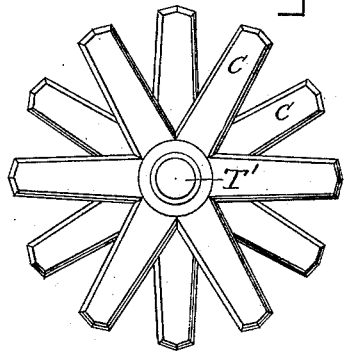
Fig. 8.
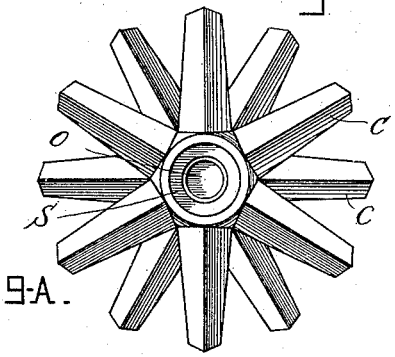
Fig. 9.
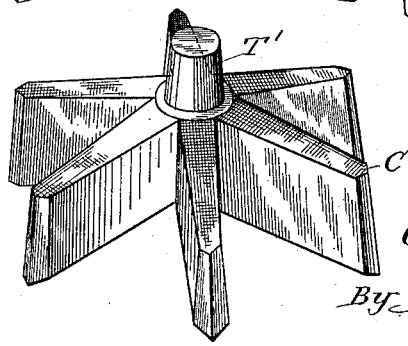
Fig. 9-A.
Witnesses:
Inventor:
Georges d'Infreville
By H. C. Townsend
Attorney (No Model.) 4 Sheets—Sheet 3.
G. D'INFREVILLE.
ZINC ELECTRODE FOR GALVANIC BATTERIES.
No. 422,925. Patented Mar. 11, 1890.
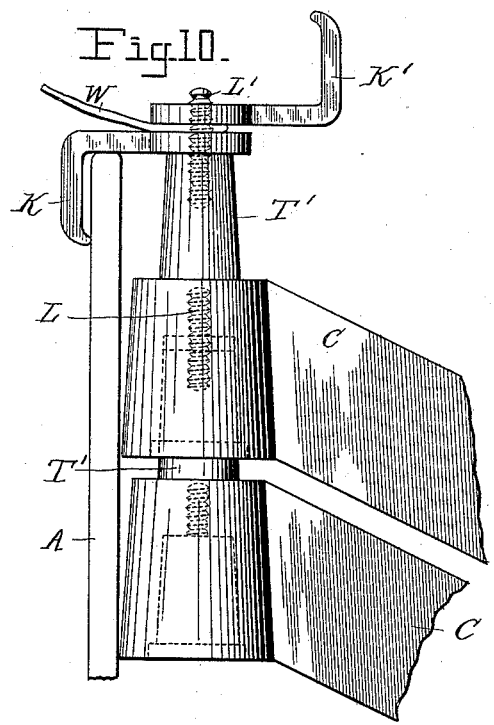
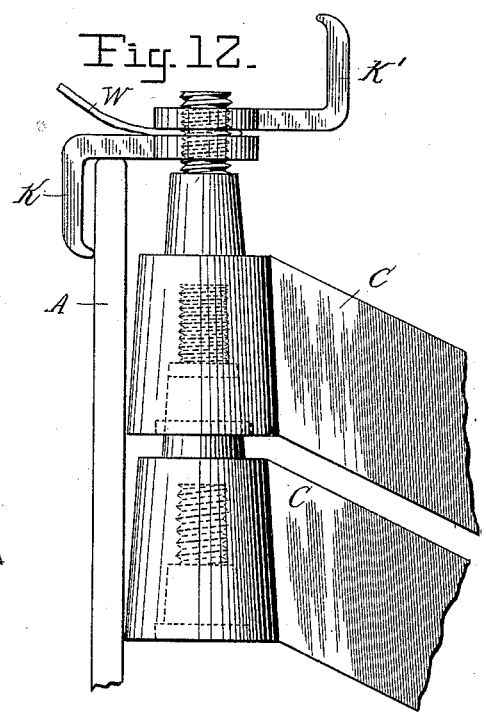
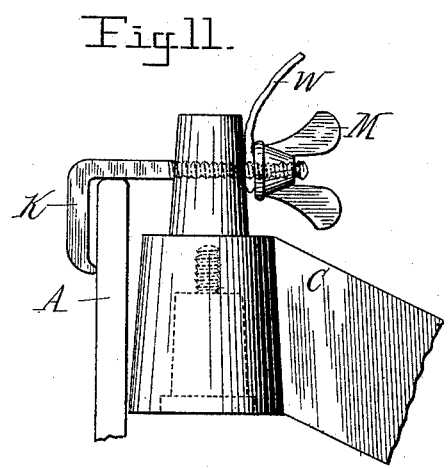
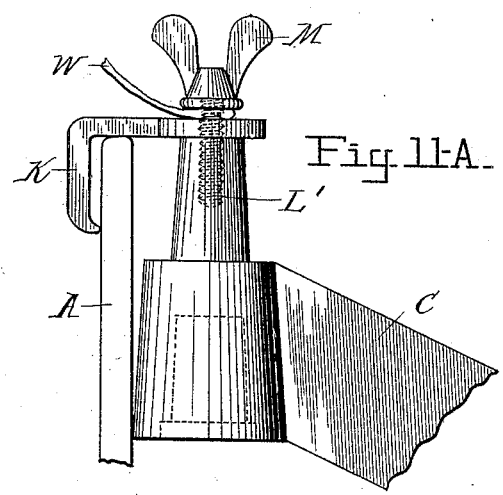
Witnesses:
Inventor:
Georges d'Infreville
By Townsend
Attorney (No Model.) 4 Sheets—Sheet 4.
G. D'INFREVILLE.
ZINC ELECTRODE FOR GALVANIC BATTERIES.
No. 422,925. Patented Mar. 11, 1890.
FIG:13.
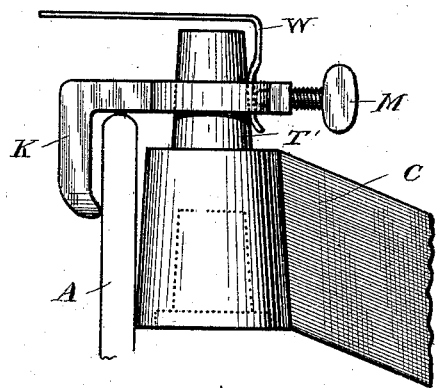
FIG:16.
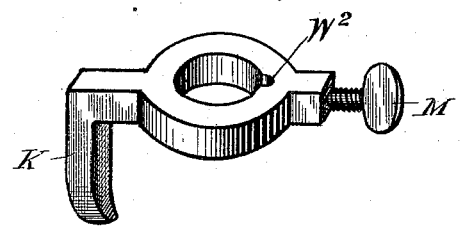
FIG:14.
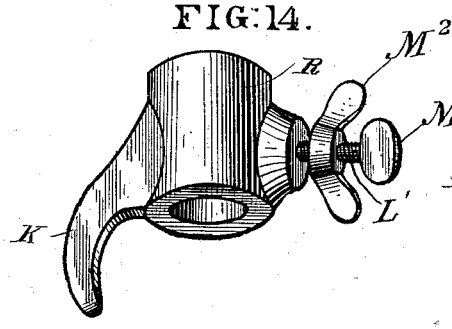
FIG:17.
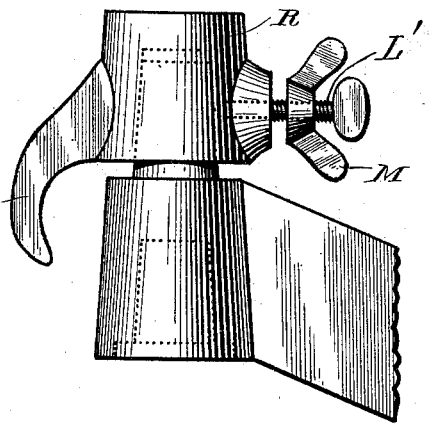
FIG:15.
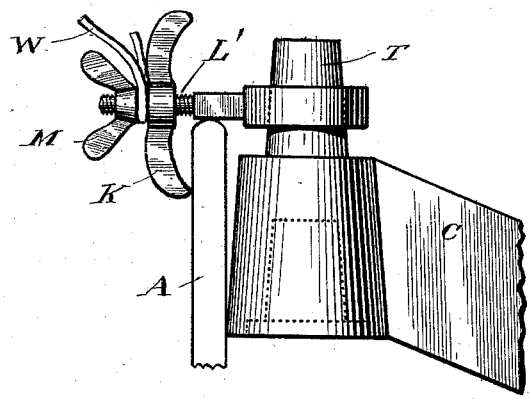
FIG:18.
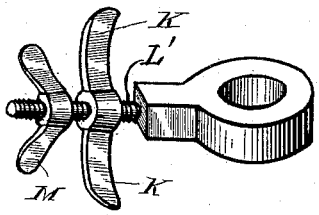
WITNESSES.
INVENTOR.
Georges d'Infreville
BY
ATTORNEY.

UNITED STATES PATENT OFFICE.

GEORGES D'INFREVILLE, OF NEW YORK, N. Y.

ZINC ELECTRODE FOR GALVANIC BATTERIES.

SPECIFICATION forming part of Letters Patent No. 422,925, dated March 11, 1890.

Application filed June 27, 1889. Serial No. 315,788. (No model.)

*To all whom it may concern:*

Be it known that I, GEORGES D'INFREVILLE, a citizen of the United States, and a resident of New York, in the county of New York and State of New York, have invented a certain new and useful Electric Battery, of which the following is a specification.

My invention relates to the construction of that plate or element of galvanic batteries which, like the zinc element for a sulphate-of-copper or gravity battery, consumes and requires to be renewed.

Heretofore in this class of batteries there has been great waste of material, owing to the fact that the zinc element must be removed before it is entirely consumed.

The object of my invention is, mainly, to overcome this objection; and to this end it consists in using for the zinc or more rapidly-consumed element a number of plates or pieces adapted to be connected to one another in column by joints or connections which are liquid-tight or adapted to preserve the connecting parts from the action of the battery-liquid, so that a partially-consumed plate may be connected or attached to the bottom of a fresh or new plate, which latter, after being partially consumed and after total or practically total consumption of the first, may in its turn be used in connection with a fresh plate, and so on, thus permitting practically all the zinc to be consumed. The connecting devices may be of any suitable character, such as will protect the sustaining or attaching parts from the direct action of the battery-liquid. By preference I suspend each plate or part of the compound element from the part above it, thus dispensing with the use of extraneous supporting or attaching devices for holding the zinc or similar element in proper position in the liquid with relation to the lower or copper element. The means of suspension or connection are preferably a stud and socket on each part or plate of the compound element, such socket being closed or walled in at its bottom to prevent access of liquid to the stud and to the interior surfaces of the socket, thereby preserving the same from erosion and permitting them to be used in rebuilding the zinc column from partially-consumed parts attached to fresh or new parts. The stud might be the only means of attachment or suspension; but to insure the continuity of connection and avoid the danger of parts of the element dropping off I in some cases employ in addition other means of securing the parts together. I am aware that it has before been proposed to make the carbon element of a galvanic battery from a number of plates or pieces of conglomerate supported one on top of the other and connected by joints; but in such case, owing to the porous nature of the material, the liquid can reach the joints. My invention, however, applies only to the more rapidly-consumed element of a battery, which, by reason of its consumption in the battery-liquid, requires renewal. The stud may be turned so as to fit the socket and form good connection, and is also preferably tapered, while the socket is correspondingly tapered. I also prefer to place the socket at the bottom and the stud at the top side, since thereby I may more readily provide a gas-collecting cavity at the joint to protect the joint against corrosion.

My invention consists, also, in the provision of a gas-holding cavity to protect the joint between two members of the column or compound element from corrosion.

My invention consists, also, in giving the plate or element a certain form for the double purpose of producing uniform waste or consumption and facilitating casting.

I have in the accompanying drawings illustrated my invention as carried out in connection with various forms of gravity-battery, but do not limit myself to such form of battery, since the invention is applicable to all cases where there is a battery plate or element which, being immersed in a liquid, gradually wastes and requires to be renewed.

In the drawings, Figure 1 is a vertical section through a battery-jar showing two of the zinc elements or electrodes connected together and supported from the side of the jar in accordance with my invention. Fig. 2 is a vertical section through the zinc plates or elements of Fig. 1. Fig. 3 is a perspective view showing the under side of a crow-foot zinc constructed in accordance with my invention. Fig. 4 is a perspective view of the same form of zinc, showing from the top. Fig. 5 is a bottom view of the same. Fig. 6 is a vertical section of the battery, showing another form of zinc plate as suspended from the center of the battery plate or cover. Fig. 7 is a side elevation of the same battery, the glass jar being in section. Figs. 8 and 9 are respectively top and bottom views of two connected plates or elements, such as shown in Figs. 6 and 7. Fig. 9<sup>A</sup> is a perspective view of a form of battery-plate embodying my invention. Figs. 10, 11, 11<sup>A</sup>, and 12 illustrate various modifications in the devices for supporting the elements one by the other and to the side of the jar, and also in the means for clamping the battery-wire. Figs. 13, 14, 15, 16, 17, and 18 illustrate other modifications in side elevation and perspective, to be more particularly hereinafter referred to.

Referring to Figs. 1 to 5, inclusive, A represents the ordinary glass jar of a gravity-battery, B the copper plate or electrode, and W the wire connecting therewith.

C represents the zinc plate or electrode provided with a socket or opening O at its bottom and with a stud T' at its top. The opening O has an annular offset to form a gas-holding chamber at S when the stud T' of one element is fixed into the socket O of an element above it. In this chamber S the air imprisoned at the time of dipping the elements into the solution or the escaping hydrogen or other gas evolved in the operation of the battery will collect, and being retained there will prevent access of the battery solution to the joint between the stud and socket. By this means the joint is protected against corrosion or disintegration and the dropping of the lower plate C is avoided. The stud and the socket of each element are made complementary to one another—that is to say, the stud of any plate or element is adapted to fit snugly into the socket of any other. The stud and socket are preferably tapered, as shown, to form a close joint, and the stud and socket may be both turned down to engage, so that a perfect joint shall be formed. By the turning operation a polished or clean surface will be produced suitable for making a good joint. This polishing or turning is not, however, absolutely necessary; but it aids in forming a good frictional and electrical joint, which will prevent the entrance of the solution between the surfaces in abutment. The chamber S also serves to collect and retain any oil that may be on the surface of the battery-liquid, and which being there retained will prevent the solution from creeping into the joint.

R is the body of the hook by which the elements are sustained in the side of the battery, and K is the hook itself. The support R K is formed also with a socket in its body adapted to receive the stud of the upper plate or element C.

In the drawings I show a column of two zincs only connected together, the lower zinc being illustrated as partially wasted. On further and continued use of the battery the wasting may take place to such an extent that the lower one will be entirely consumed and the upper one partially consumed, when a new element may be attached in the place of the upper and the latter secured to the bottom of the new one and in vertical connection therewith, as described. The supporting-hook R K is provided at its top with a screw E and clamping-nut M for attachment of the conducting-wire in the ordinary manner.

In Figs. 6 and 7 I have shown another form of zinc element C, having radiating arms radiating from the center. In this instance the element is supported on the center of a battery cover or plate V, of bronze or other conducting material, which is formed with a socket O, adapted to receive the stud T' of the upper element C. The projection or body P has a screw on its top for the reception of the clamp-nut M. The radial projections C, Figs. 6, 7, 8, &c., are preferably made to slant downwardly from the central trunk, so that the radial arms of the zinc will be consumed before the support.

As shown in Fig. 9<sup>A</sup>, I also make the element of decreasing cross-section or mass in an upward direction. In this form the plate may be very readily cast. Besides, the greater amount of the element is in position where the greater waste or consumption takes place and a more uniform consumption of the element is thereby secured. This form and slanting are also used with the crow-foot pattern shown in Figs. 1, 2, 3, 4, and 5.

In Fig. 10 the plates or elements are shown as connected by a screw L, which may be formed of any suitable material, and is preferably attached permanently to the tapered end of the stud T'. By this screw the accidental disconnection of the two or more elements from one another is entirely avoided. I prefer, however, to retain even in this form a stud adapted to fit into the socket as a means of making good electrical connection. In this instance the hook K supports the top element by means of the screw L' for the latter, the hook being provided with a screw-tapped opening for attachment of the screw. The wire W may be secured by means of a hook K' of the same construction as K and interchangeable therewith.

In Fig. 11 the hook has a lateral projecting screw-shank adapted to pass through the stud on the top of the battery plates or elements and to receive a clamping-nut M for holding the plate onto the hook and at the same time fastening the wire W.

In the modification shown in Fig. 11<sup>A</sup> the stud is tapped to receive a clamp-screw L', the thumb-piece of which is indicated at M. In this instance the horizontal portion of the hook bears on the top of the stud and the upper element is clamped to it by means of the screw L', the battery-wire W being at the same time fastened to the plate.

In the modification indicated in Fig. 12 the end of the stud is provided with a screw-threaded extension integral with it and adapted to engage with a screw-threaded recess at the bottom of the socket or opening O. This screw-threaded extension might be utilized in connection with hooks K K' in obvious manner.

In Fig. 13 the stud fits into an annular socket, such as shown in Fig. 16, in the extension of the hook, and is fastened therein by means of a clamp-screw M, which at the same time bears against the electric conductor W, seated in a groove at $W^2$.

Fig. 14 shows a different form of hook, the body of the hook R being provided with a socket which stops short of the upper side thereof. A set-screw M may be used, as before, for holding the stud firmly in the socket, and in connection with the stem of the set-screw a clamping-nut $M^2$ may be employed for holding the battery-wire.

Fig. 17 shows the battery element and hook as connected.

Figure 3:
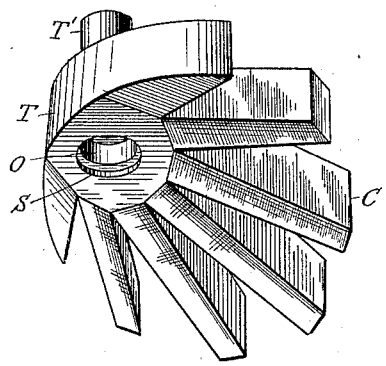
Figure 1:
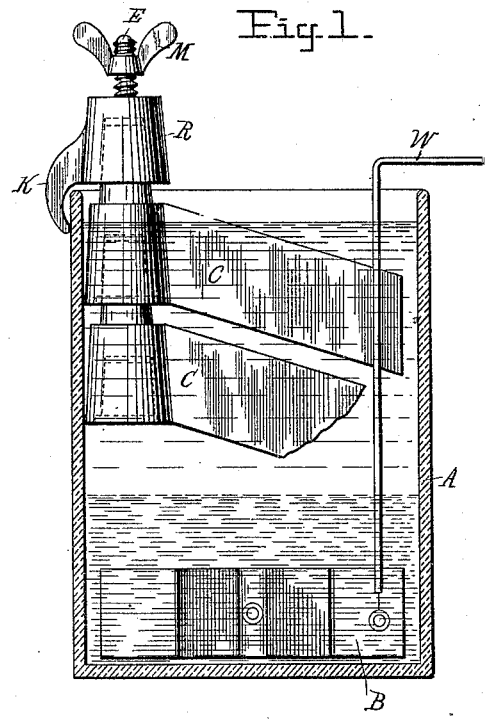
Figure 4:
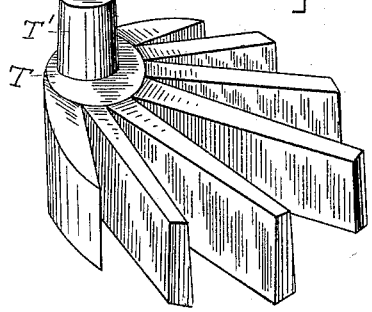
Figure 5:
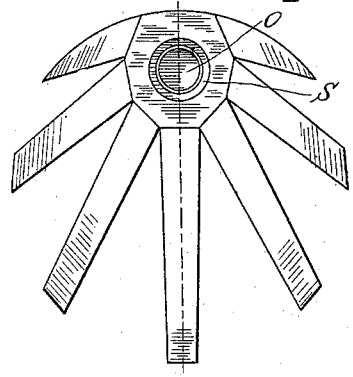
Figure 2:
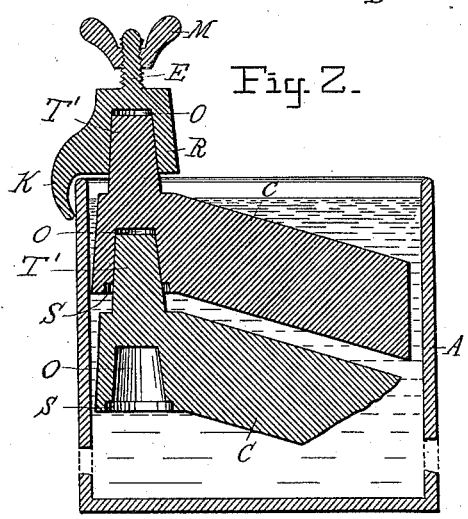

In the modification shown in Fig. 15 the hook portion of the supporting device is mounted on a screw L', extending laterally from the ring or socket for the stud T'. A nut M on the screw L' serves as the clamp-nut for the battery-wire. These parts are shown as detached in Fig. 18.

These various modifications in the form of the hook simply serve to illustrate the various ways in which the upper plate or electrode may be supported by the hook, and by means similar to that employed for connecting or supporting a partially-wasted element by a new one.

While I have shown a stud and socket as the means for attachment of two or more elements, one above the other, I do not limit myself to such means, as the gist of my invention consists in so constructing each element that it may serve in turn as the means for supporting a partially-wasted element, and may afterward, when itself partially wasted, be supported by a new one, both elements being immersed in the battery-liquid.

While I prefer to use the same means for attaching the element to the supporting device that are used for attaching one element to another, I do not limit myself thereto, since it is obvious that, if desired, other devices might be employed.

What I claim as my invention is—

1. In a galvanic battery, an element of zinc or its equivalent, as described, consisting of two or more plates or parts provided with devices for the suspension of one part from the other, said devices above and below being complementary to one another, as described, and adapted to form a liquid-tight joint or connection, as and for the purpose described.

2. In a galvanic battery, a plate of zinc or its equivalent, as described, having on one side a stud and on the other a socket or cavity closed at its bottom, said stud and socket being complementary and adapted to form liquid-tight joints or connections with other elements, as and for the purpose described.

3. In a galvanic battery, a compound wastable element consisting of two or more plates or pieces suspended one from the other in column and each provided with connecting devices complementary to one another, as described, whereby a partially-consumed upper plate may take its place beneath a new plate and be sustained thereby in electrical connection with said new plate, as and for the purpose described.

4. A zinc plate or element for a galvanic battery, having on one side a solid projection or stud and on the other a socket closed in at its bottom by the zinc of the element, as and for the purpose described.

5. The combination, with a battery element, of a supporting-hook having a vertical screw-threaded opening, and a screw projecting from the top of the battery element, whereby a hook may be used as the clamp for the battery-wire or as a means for supporting the element at pleasure.

6. A battery plate or element having a stud on its top side and a socket with an offset, as described, on its bottom, said socket and stud being complementary to one another, as and for the purpose described.

7. In a battery plate or element, detachably-connected sections having a gas-holding cavity at the point of connection, as and for the purpose described.

8. In a gravity-battery, a plate or element having a number of arms projecting or slanting downwardly from a supporting-trunk, as and for the purpose described.

Signed at New York, in the county of New York and State of New York, this 22d day of June, A. D. 1889.

GEORGES D'INFREVILLE.

Witnesses:
WM. H. CAPEL,
THOS. F. CONREY.